United States Patent
Szeto et al.

(10) Patent No.: US 7,406,501 B2
(45) Date of Patent: Jul. 29, 2008

(54) SYSTEM AND METHOD FOR INSTANT MESSAGING USING AN E-MAIL PROTOCOL

(75) Inventors: Christopher T. Szeto, Santa Clara, CA (US); Henri Torgemane, Santa Ana, CA (US); Thyagarajapuram Swaminathan Ramakrishnan, Saratoga, CA (US)

(73) Assignee: Yahoo! Inc., Sunnyvale, CA (US)

( * ) Notice: Subject to any disclaimer, the term of this patent is extended or adjusted under 35 U.S.C. 154(b) by 0 days.

(21) Appl. No.: 10/610,902

(22) Filed: Jun. 30, 2003

(65) Prior Publication Data

US 2004/0215721 A1    Oct. 28, 2004

Related U.S. Application Data

(60) Provisional application No. 60/457,479, filed on Mar. 24, 2003.

(51) Int. Cl.
*G06F 15/16*    (2006.01)
(52) U.S. Cl. .................... 709/206; 709/227; 709/245
(58) Field of Classification Search ................. 709/200, 709/206, 230, 232, 227, 245
See application file for complete search history.

(56) References Cited

U.S. PATENT DOCUMENTS

| | | | | |
|---|---|---|---|---|
| 6,167,435 | A * | 12/2000 | Druckenmiller et al. | 709/206 |
| 6,360,254 | B1 * | 3/2002 | Linden et al. | 709/219 |
| 6,539,077 | B1 * | 3/2003 | Ranalli et al. | 379/67.1 |
| 6,539,421 | B1 * | 3/2003 | Appelman et al. | 709/206 |
| 6,609,138 | B1 * | 8/2003 | Merriam | 707/204 |
| 6,654,790 | B2 * | 11/2003 | Ogle et al. | 709/206 |
| 6,760,580 | B2 * | 7/2004 | Robinson et al. | 455/412.2 |
| 6,772,188 | B1 * | 8/2004 | Cloutier | 709/224 |
| 6,832,245 | B1 * | 12/2004 | Isaacs et al. | 709/206 |
| 6,965,666 | B1 * | 11/2005 | Zhang | 379/88.17 |
| 7,013,350 | B2 * | 3/2006 | Enns et al. | 709/245 |
| 7,080,148 | B2 * | 7/2006 | Weigand | 709/228 |
| 7,171,473 | B1 * | 1/2007 | Eftis et al. | 709/227 |
| 7,200,634 | B2 * | 4/2007 | Mendiola et al. | 709/204 |
| 2001/0003202 | A1 * | 6/2001 | Mache et al. | 713/153 |
| 2001/0025280 | A1 * | 9/2001 | Mandato et al. | 707/3 |
| 2001/0047305 | A1 * | 11/2001 | Bowen, Jr. | 705/26 |
| 2002/0007398 | A1 * | 1/2002 | Mendiola et al. | 709/206 |
| 2002/0065887 | A1 * | 5/2002 | Paik et al. | 709/205 |
| 2003/0065941 | A1 * | 4/2003 | Ballard et al. | 713/201 |
| 2003/0229722 | A1 * | 12/2003 | Beyda | 709/310 |
| 2004/0054736 | A1 * | 3/2004 | Daniell et al. | 709/206 |
| 2004/0073621 | A1 * | 4/2004 | Sampson | 709/209 |
| 2004/0111479 | A1 * | 6/2004 | Borden et al. | 709/206 |
| 2004/0128356 | A1 * | 7/2004 | Berstein et al. | 709/206 |
| 2004/0145773 | A1 * | 7/2004 | Oakeson et al. | 358/1.15 |
| 2004/0154022 | A1 * | 8/2004 | Boss et al. | 719/310 |
| 2004/0158611 | A1 * | 8/2004 | Daniell et al. | 709/206 |
| 2004/0181550 | A1 * | 9/2004 | Warsta et al. | 707/104.1 |

\* cited by examiner

*Primary Examiner*—William C. Vaughn, Jr.
*Assistant Examiner*—Kristie D Shingles
(74) *Attorney, Agent, or Firm*—Morrison & Foerster LLP

(57) ABSTRACT

Systems and methods allowing an instant messaging user to exchange messages with an e-mail user. To the instant messaging user, the experience is a seamless exchange of instant messages; to the e-mail user, the experience is a seamless exchange of e-mail messages. Conversion of an instant message to an e-mail message includes insertion of a token into the e-mail message, and conversion of an e-mail message to an instant message includes validating a token extracted from the e-mail message.

63 Claims, 8 Drawing Sheets

| TOKEN | IM USER | E-MAIL ADDRESS | ALIASES | MISMATCH COUNT | TIME STAMP |
|---|---|---|---|---|---|
| T | P | E@email.com | E@isp.com<br>E@isp2.net | 3 | dd-mmm-yyyy |
| | | | | | |
| | | | | | |

FIG. 4

SYSTEM AND METHOD FOR INSTANT MESSAGING USING AN E-MAIL PROTOCOL

CROSS-REFERENCES TO RELATED APPLICATIONS

This application claims the benefit of U.S. Provisional Application No. 60/457,479, filed Mar. 24, 2003, entitled "Instant Messaging Using an E-mail Protocol," which disclosure is incorporated herein by reference for all purposes.

BACKGROUND OF THE INVENTION

The present invention related to communication via a network such as the Internet, and in particular to systems and methods for exchanging messages between an instant messaging user and an e-mail user.

The Internet offers various ways for users to communicate with other users, including electronic mail (e-mail) and instant messaging. These two communications media differ in various respects. For instance, e-mail is an open system: an e-mail user with access to the Internet can exchange e-mail messages with anyone else who has access to the Internet, regardless of which service providers the sender and recipient use.

While the openness of e-mail provides great flexibility, it also allows various abuses. For instance, most e-mail servers assume that users want to receive all incoming mail. While some systems allow a user to define various filters to block selected senders, there is generally no mechanism enabling a user to reliably limit who can send messages to that user. As a result, unwanted e-mail messages (commonly referred to as "spam") from senders with whom a user has no prior association have become a significant problem. In addition, while e-mail servers typically require a user to log in to access his or her e-mail account, e-mail protocols generally do not include a mechanism for establishing security or trust between a sender's system and a recipient's system. Since e-mail headers can be forged, it can be difficult for a recipient of a message to be certain that a message purporting to be from a particular sender is really from that sender.

Partly as a consequence of these drawbacks, instant messaging (IM) has become increasingly popular. Instant messaging provides communication within a closed community, i.e., only registered users can send or receive messages via an instant messaging service. Because users are required to sign in to the same system (if not necessarily the same server) with a preselected user name and password before sending messages, impersonation is more difficult than with e-mail. Also, instant messaging software typically allows a user to define a list of "friends" (i.e., other registered users with whom the user wishes to communicate) and to reject or ignore messages sent by other users. Thus, the problem of unwanted messages is reduced.

Instant messaging is also appealing to some users because instant messaging client interfaces provide a more conversational and spontaneous feel than e-mail. For instance, instant messaging services generally provide information to a user about whether his friends are currently logged in or not, so that the user has some idea about whether a rapid response can be expected. The client can display messages from the user's friends on the user's screen without the user having to notice that a message has arrived or take any action to open the message. Many instant messaging clients also offer a "chat" mode, in which a window displays messages from two (or more) communicating users sequentially as they are entered; the user does not have to go through a sequence of steps to respond to a message or check to see if a reply to a previous message has come in.

Instant messaging services, however, generally limit the users who can exchange messages to a pool of subscribers, i.e., users who have accounts with the service provider. To communicate with non-subscribers (who may subscribe to a different instant messaging service or no instant messaging service), a user typically has to resort to another medium, such as e-mail, typically involving switching to a different program, protocol and user interface.

Some instant messaging services allow a non-subscriber to sign on as a guest for the limited purpose of corresponding with a particular subscriber, but this typically requires the subscriber and the guest to communicate via some other channel (e.g., e-mail) first, to arrange an instant messaging session. Various other demands may also be placed on the guest. For example, the guest generally has to use the service provider's instant messaging interface, which often requires the guest to download and install the service provider's software. The service provider may also request personal information (which the guest may not want to share) in the course of setting up an interface for the guest. Such obstacles limit the effectiveness of guest access to instant messaging services.

It would, therefore, be desirable to provide an instant messaging service that expanded a user's ability to communicate with users other than fellow subscribers to the service.

BRIEF SUMMARY OF THE INVENTION

Embodiments of the present invention provide systems and methods allowing an instant messaging user to exchange messages with an e-mail user. To the instant messaging user, the experience is a seamless exchange of instant messages; to the e-mail user, the experience is a seamless exchange of e-mail messages. Conversion of an instant message to an e-mail message includes insertion of a token into the e-mail message, and conversion of an e-mail message to an instant message includes validating a token extracted from the e-mail message. In some embodiments, the token provides additional information that is usable to distinguish between legitimate and illegitimate e-mail messages.

According to one aspect of the invention, a method for exchanging messages between an instant messaging user and an e-mail user is provided. A first outgoing instant message is received from the instant messaging user for delivery to an e-mail address of the e-mail user. A first outgoing e-mail message is created from the first outgoing instant message. A token is generated, the token being usable to associate a subsequent incoming e-mail message with the instant messaging user. The token is inserted into the outgoing e-mail message in such a manner that the token is returnable in a reply to the first outgoing e-mail message. The first outgoing e-mail message is then transmitted to the e-mail address. A subsequently received e-mail message that includes the token is deliverable to the instant messaging user as an incoming instant message. More specifically, an incoming e-mail message that includes the token may be received. The token is extracted from the incoming e-mail message. The instant messaging user can be identified based at least in part on the token. The incoming e-mail message is converted to an incoming instant message and delivered as an instant message to the instant messaging user.

In some embodiments, the token is re-used to send a second outgoing instant message. That is, a second outgoing instant message is received from the instant messaging user, the second outgoing instant message being a reply to the incoming instant message (which was converted from an e-mail message). The identifier of the instant messaging user and the e-mail address of the e-mail user are used to locate the token that was previously generated. A second outgoing e-mail message is created from the second outgoing instant message. The token is inserted into the second outgoing e-mail message, the second outgoing e-mail message is transmitted to the e-mail address of the e-mail user.

According to another aspect of the invention, a method for exchanging messages between an instant messaging user and an e mail user is provided. A token is generated that is usable to associate incoming e mail messages with the instant messaging user. An incoming e mail message that includes the token is received. The token is extracted from the incoming e mail message. Based at least in part on the token, the instant messaging user is identified. The incoming e mail message is converted to an incoming instant message, and the incoming instant message is delivered to the instant messaging user. The token may be generated in response to a request from the instant messaging user.

According to another aspect of the invention, a system for transmitting messages between an instant messaging user and an e-mail user includes an outgoing message module, an incoming message module, and a token module. The outgoing message module is configured to receive an outgoing instant message from the instant messaging user to the e-mail user, to convert the outgoing instant message into an outgoing e-mail message, the outgoing e-mail message including a first token, and to transmit the outgoing e-mail message to the e-mail user. The incoming message module is configured to receive an incoming e-mail message that includes the first token, to convert the incoming e-mail message into an incoming instant message based at least in part on the first token, and to transmit the incoming instant message to the instant messaging user. The token module is configured to communicate with the outgoing message module and the incoming message module, the token module further configured to maintain a set of valid tokens including at least the first token.

In some embodiments, the system also includes an instant messaging server configured to communicate with the incoming and outgoing message modules and with an instant messaging client that creates the outgoing instant message. The instant messaging server receives the outgoing instant message from the instant messaging client and forwards the outgoing instant message to the outgoing message module; the instant messaging server also receives the incoming instant message from the incoming message module and forwards the incoming instant message to be displayed by the instant messaging client.

In each of the methods and systems described herein, it should be understood that repeated instances might be present. Thus, multiple instant messaging users might be sending multiple messages each, to many e-mail users. In some cases, thousands to millions of instant messaging users might communicate with thousands to millions of e-mail users, generating up to a billion messages or more. Nothing here precludes one individual from being an instant messaging user in one context and an e-mail user in another context. Users are not limited to human users, as a computer process might be an instant messaging user, an e-mail user, or both.

The following detailed description together with the accompanying drawings will provide a better understanding of the nature and advantages of the present invention.

BRIEF DESCRIPTION OF THE DRAWINGS

FIG. 4 is an illustration of a token table according to an embodiment of the present invention.

DETAILED DESCRIPTION OF THE INVENTION

In accordance with embodiments of the present invention, an instant messaging service is provided that allows an instant messaging user to exchange messages with an e-mail user (who may or may not have an account with the instant messaging service). To the instant messaging user, the experience is a seamless exchange of instant messages; to the e-mail user, the experience is a seamless exchange of e-mail messages. As used herein, an "instant messaging service" includes any service that enables exchanges of messages between authenticated users and prevents unauthorized users from transmitting messages, regardless of particular message formats, form factors, or communication pathways that may be used; "e-mail" includes various protocols for transmitting messages from one user to another that do not inherently guarantee to a message recipient that the sender has been authenticated.

This specification includes examples of e-mail addresses and domains for illustration purposes. The invention is not limited to these particular addresses or domains or to the style or format of those particular labels. It should also be understood that any correspondence between any labels used herein and labels actually used for existing or future e-mail addresses, domains, host names and the like are purely coincidental.

Figure 1:
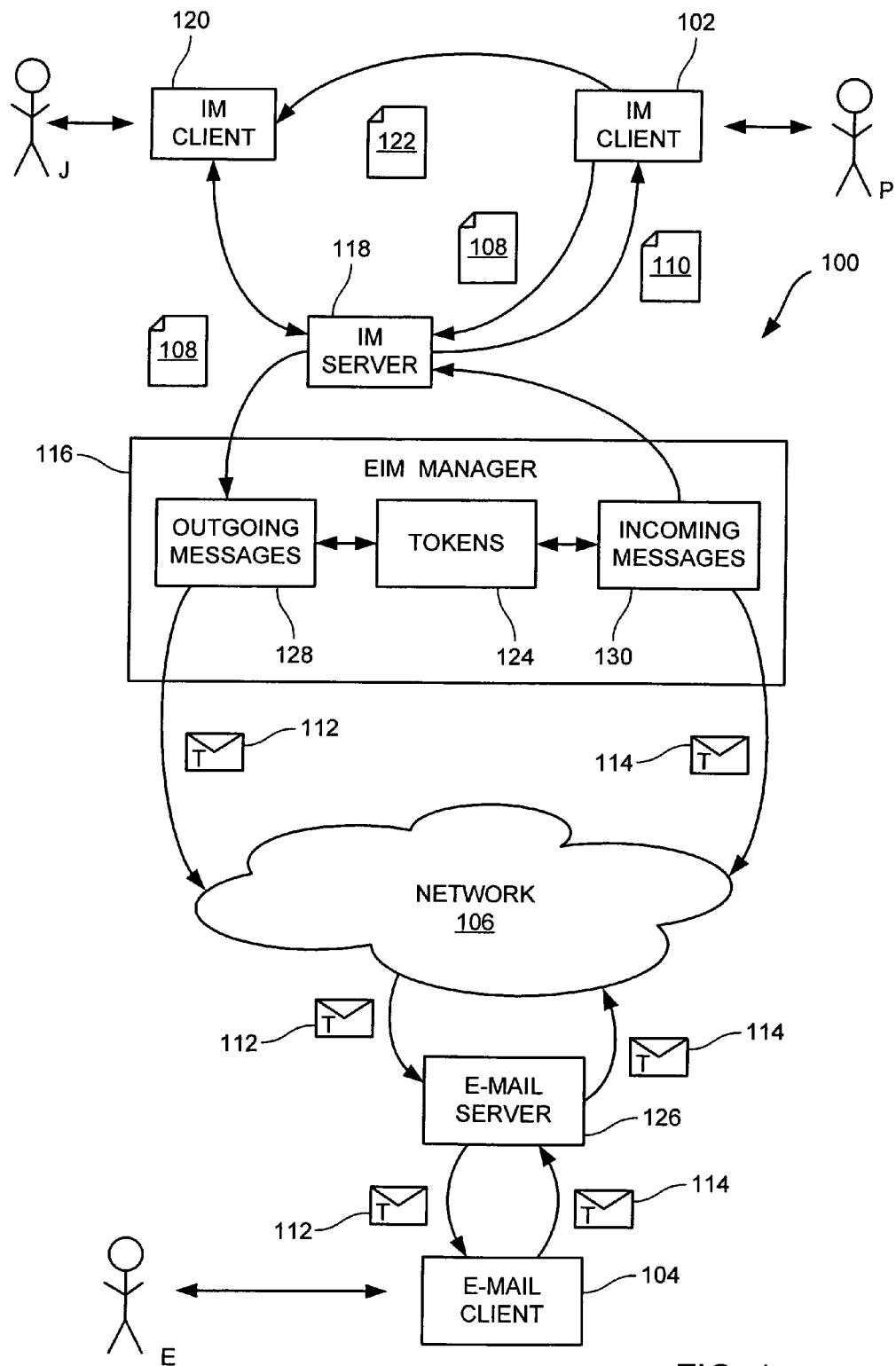
FIG. 1 is a block diagram of a communication system according to an embodiment of the present invention.

FIG. 1 is a high-level block diagram of a communication system 100 according to an embodiment of the present invention. Communication system 100 enables an instant messaging (IM) user P using an instant messaging client 102 and an e-mail user E using an e-mail client 104 to exchange messages via a network 106. To user P, the incoming and outgoing messages appear as instant messages 110, 108, while to e-mail user E, the incoming and outgoing messages appear as e-mail messages 112, 114. Conversion between instant message and e-mail protocols formats is provided by an e-mail instant message (EIM) manager 116.

In the examples herein, network 106 might be described as the Internet. However, it should be understood that network 106 can be implemented in a number of ways without departing from the scope of the invention. For example, network 106 might comprise one or more of a local area network, a wide area network, a wireless network, a store-and-forward system, a legacy network, and a network or transport system subsequently developed. One developing network that might be used is a next-generation Internet.

More specifically, IM user P uses client 102 to access an instant messaging service to which P subscribes. As used herein, "subscribes" means that P is part of the closed community of users that have identities (e.g., user names or profiles) recognized by the instant messaging service. In this embodiment, when P accesses the service, client 102 establishes a connection to an IM server 118, with user P supplying a pre-established unique user name (e.g., "P") and a password for authentication. Alternatively, other methods of authentication might be used, such as smart cards, biometrics, dedicated links, challenge/response, etc.

Figure 2:
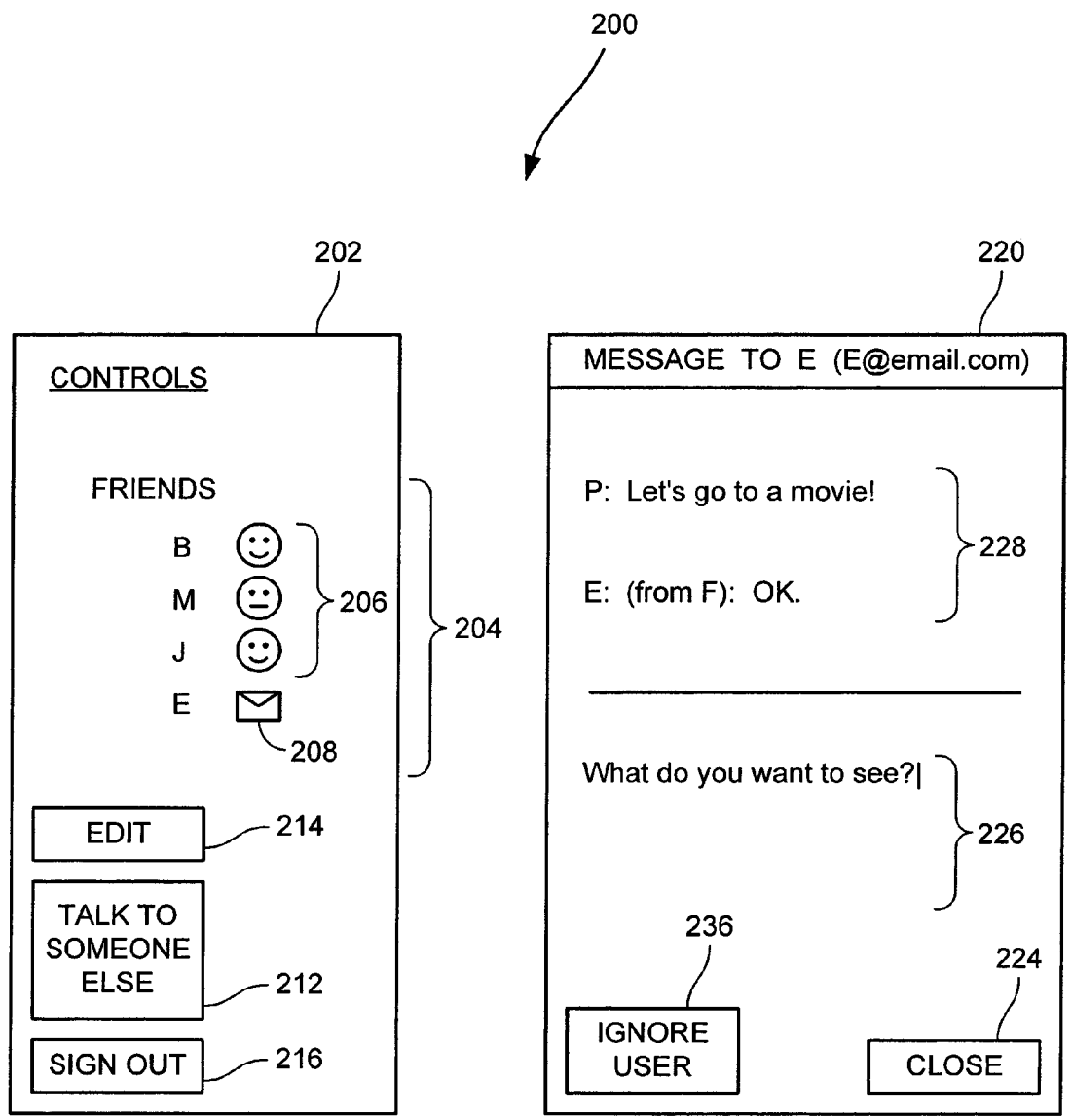
FIG. 2 is a screen view of elements of an instant messaging client interface according to an embodiment of the present invention.

Once the connection is established, client 102 operates an instant messaging program that enables P to use the service. Some elements of a graphical user interface 200 for one embodiment of IM client 102 are shown in FIG. 2. A control window 202 appears when the IM program starts, allowing user P to view his "friend list" 204. Friend list 204 includes other instant messaging users (B, M, J) designated by user P; for each friend, the current status (e.g., signed in to the service or not) is indicated via status icons 206. In this example, a smiling face indicates that the friend is signed in while a sleeping face indicates that the friend is not. Other icons may also be used. User P can send a message to anyone on friend list 204 by selecting the friend's name. For instance, if another instant messaging user J has signed on to the service using a client 120 (as shown in FIG. 1), user P can send an instant message 122 to user J. The instant message 122 and any reply from user J may be routed through IM server 118; alternatively, clients 102 and 120 may establish a connection that does not pass through IM server 118.

Friend list 204 may also include nonsubscriber users (e.g., non-subscribers to the instant messaging service) who can be reached via e-mail, such as e-mail user E, whose fully qualified e-mail address is "E@email.com." User P is able to exchange messages with user E using interface 200. A special status icon 208 may be used in friend list 204 to indicate that messages to user E will be received by E via e-mail. In an alternative embodiment, if the e-mail user's status (online or offline) can be determined with sufficient reliability, status icons such as icons 206 or distinctive icons for nonsubscribers may also be used. In some embodiments, user P may be provided the option to have friend list 204 display the fully qualified e-mail address for the e-mail user in addition to or instead of a personal name.

Control window 202 may also provide other options, such as a button 212 allowing the user to send a message to someone not on friend list 204, a button 214 allowing the user to edit friend list 204 (e.g., to add or remove a user), a button 216 for signing out (closing the instant messaging program and disconnecting from IM server 118), and so on. Other controls and options may also be provided.

Interface 200 also includes a message window 220 that appears when user P activates a control in control window 202 to send an instant message to a user (e.g., user J or user E), or when user P receives a message from another user with whom P has not previously exchanged messages during the current session. Message window 220, which may be generally conventional in appearance, includes an input area 226 in which user P can type a message. In some embodiments, an instant message created and/or received by user P may also include images, attached files, and/or other non-text elements. A history area 228 is advantageously provided above input area 226; history area 228 includes a sequential display of messages previously exchanged by the users during the course of an instant messaging session. The sender of each message can be indicated by a user identifier (e.g., labels "P" and "E") and/or by a distinctive typface (font, color, etc.). In some embodiments, new messages from either user are transmitted and appear in the history area as they are typed; in other embodiments, user P types a message, then transmits it by activating a designated key, key combination, or onscreen button, with the message appearing in the history area only after P transmits it. History area 228 may include a scroll bar (not shown) to allow a longer message history to be displayed. Various control buttons are advantageously provided, such as a "Close" button 224 that closes message window 220 and an "Ignore User" button 236 that instructs the instant messaging client 102 to ignore further messages from the sender. It will be appreciated that other interface configurations for instant messaging client 102 are also possible.

Returning to FIG. 1, to send a message to e-mail user E, user P creates an instant message 108 addressed to the fully qualified e-mail address of e-mail user E (e.g., E@email.com, where email.com is the mail server where user E receives e-mail). Instant messaging client 102 advantageously allows P to create and send the message to user E in the same manner as a message to user J; thus, from user P's perspective, he is sending an instant message. It should be noted that user P is not restricted to sending messages to e-mail users who are on his friend list. For instance, interface 200 allows user P to select button 212 for sending a message to an e-mail user who is not on friend list 204; user P then supplies the fully qualified e-mail address of the e-mail user.

When user P sends instant message 108, instant messaging server 118 recognizes that the recipient is an e-mail user and forwards instant message 108 to e-mail instant message (EIM) manager 116. An outgoing message module 128 of EIM manager 116 converts instant message 108 to an e-mail message 112 addressed to E@email.com. The conversion process includes creation of a token (T) that is added to e-mail message 112 in such a way that any reply e-mail message will also include the same token T. For example, the token T may be included in the "From:" and/or "Reply-To:" headers of e-mail message 112. In alternative embodiments, the token might be inserted in a different header used for other purposes or in a header meant just for containing the token (e.g., an "X-EIM-Token:" header). In some embodiments, the token is in other than the headers and mail handling is done to preserve the token. Token T may contain any data that enables EIM manager 116 to recognize an incoming e-mail as a reply and route it to user P. Specific examples of token formats will be described below.

Tokens are advantageously managed by a token module 124 of EIM manager 116. Token module 124 maintains a searchable store of previously generated tokens that can be used to determine whether a token included in an incoming e-mail message is valid. In some embodiments, token module 124 also supports re-use of tokens; that is, a token generated when user P sends a first message to user E may be stored and used again when user P sends a subsequent message to user E. Implementations of tokens and token module 124 are described below.

Figure 3:
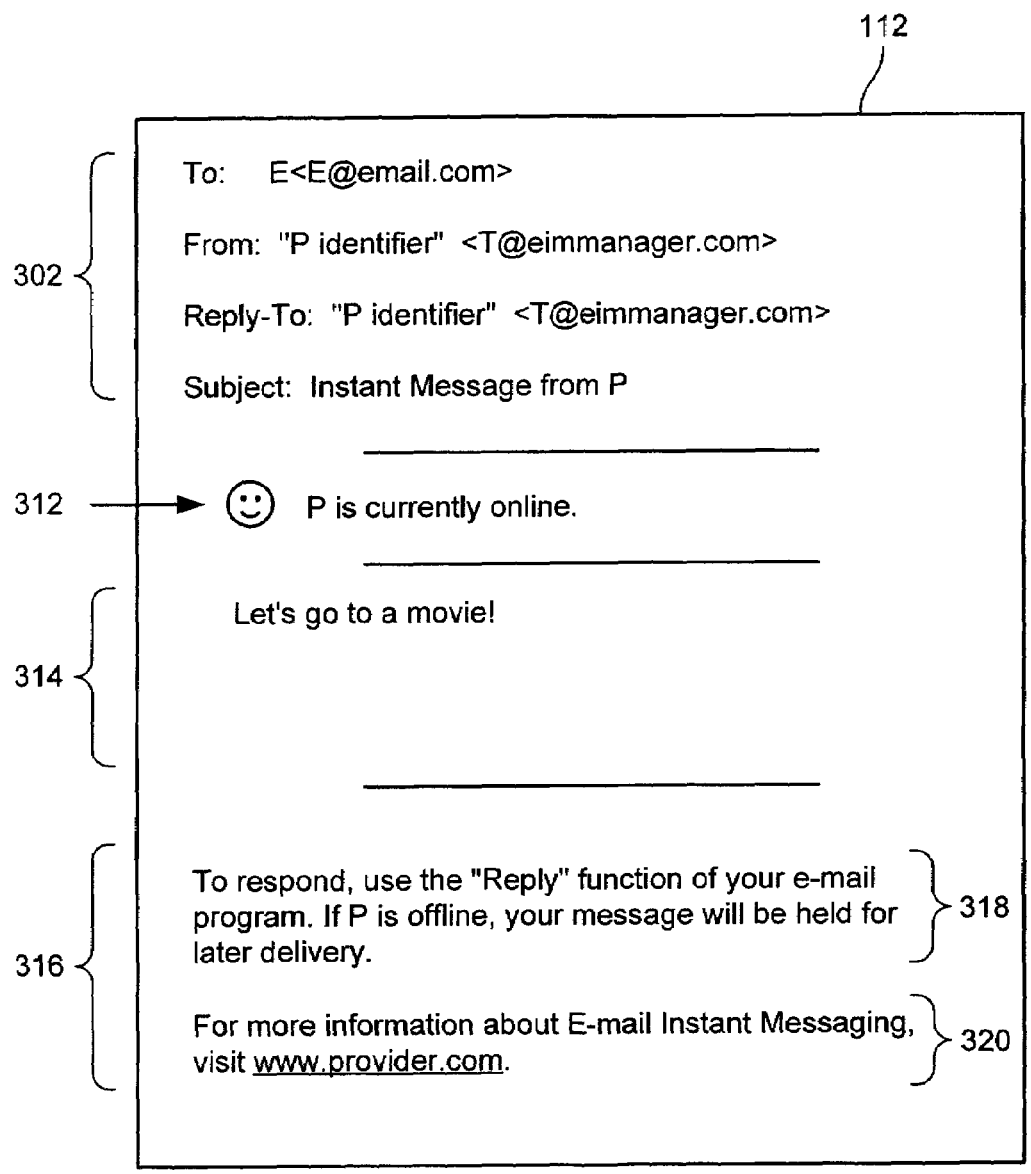
FIG. 3 is a screen view of an e-mail message according to an embodiment of the present invention.

E-mail message 112 is transmitted via network 106 to an e-mail server 126, from which user E is able to retrieve e-mail using an e-mail client 104. E-mail user E uses e-mail client 104 to open e-mail message 112. An example format for e-mail message 112 is shown in FIG. 3; it will be appreciated that other formats may be substituted. In a preferred embodiment, e-mail message 112 conforms to RFC 822, but in some embodiments noncompliant message formats might be used. Headers 302 include a "To:" header filled with E's email address, a "From:" header and a "Reply-To:" header that each include the token T, and a "Subject:" header that identifies the message as an "instant message." In this example, token T is used as the username in an e-mail address that will direct replies to EIM manager 116 (that is, "eimmanager.com" may be a network name that maps to EIM manager 116).

Body 314 contains the content from instant message 108, which was created by user P using instant messaging client 102. Body 314 may be formatted to look like an instant message, using various visual effects supported by the instant messaging service provider. For instance, "emoticons" (e.g., smiley faces) and other symbols may be rendered as images. Alternatively, body 314 may be formatted as plain text or any other desired format. In some embodiments, images, attached files, and other non-text elements may also be included.

In this embodiment, other components are included in e-mail message 112 to enhance the recipient's experience. For example, a status indicator 312 precedes body 314. Status indicator 312 replicates the feel of an instant message by advising the e-mail recipient E whether the sender P is currently online or offline. In one embodiment, status indicator 312 is implemented by including in e-mail message 112 a hypertext transfer protocol (HTTP) image request addressed to IM server 118 or to another server that communicates with IM server 118. When user E opens e-mail message 112, the HTTP request is sent to the designated server, which determines whether user P is online (e.g., based on whether or not user P is logged in to the instant messaging service) and sends back an appropriate image. The image may include a status icon corresponding to what an instant messaging user would see in her friends list, words, and/or other elements. Since the HTTP image request will generally be sent when user E actually opens (or reopens) the message, status indicator 312 can provide an accurate indication of whether user P is currently logged on. The status indicator may also provide additional functionality, such as enabling user E to activate an instant messaging client in the event that E subscribes to the same instant messaging service as user P. Examples of such status indicators are known in the art.

Footer 316 is a visually distinct block that follows body 314 and provides additional information related to the e-mail instant messaging service. For instance, footer 316 may include instructions 318 advising the recipient that she can simply use her e-mail client's "Reply" function to respond to the message. Footer 316 may also include a referral 320 to the instant messaging service, encouraging the e-mail recipient to obtain more information and/or become a subscriber. Referral 320 may include contact information (e.g., a uniform resource locator, or URL) for the instant messaging service provider. Any other desired information or images (e.g., advertising) may be included in footer 316, or footer 316 may be omitted.

Returning to FIG. 1, e-mail user E reads e-mail message 112 and replies, thereby creating a reply e-mail message 114, which includes token T or some representation thereof or other indication that E had knowledge of token T. Reply e-mail message 114 is transmitted via network 106 to EIM manager 116, where it is processed by an incoming message module 130. Upon receipt of reply message 114, incoming message module 130 extracts token T or an indicator and compares it to tokens in the token store maintained by token module 124. If the token does not match any stored token, then token T is invalid; incoming message module 130 may discard message 114 or return it to the sender (E@email.com) as undeliverable. Requiring replies to contain a valid token helps to prevent unwanted messages from being delivered to instant messaging users, as described further below.

If token T is valid, incoming message module 130 converts reply message 114 to a reply instant message 110, which is transmitted to user P's instant messaging client 102. Conversion of incoming e-mail message 114 to reply instant message 110 may include removing e-mail headers and the text of the replied to message 112 (if it was appended to message 114), format conversions, adding new message headers conforming to the instant messaging provider's protocol, and so on. EIM manager 116 then directs the reply instant message 110 to user P's instant messaging client 102, either via IM server 118 or by a different path.

Instant messaging client 102 can handle reply instant message 110 in the same way that it handles a reply message from instant messaging user J. For instance, instant messaging client 102 may open an incoming message window 230 (as shown in FIG. 2) to display the message. Thus, from user P's perspective, the response to his instant message 108 is an instant message 110.

It will be appreciated that the communication system described herein is illustrative and that variations and modifications are possible. Communication systems according to the present invention may support any number of instant messaging clients and/or e-mail clients. Each client may include any hardware and/or software components and may be implemented using a computer of conventional design including standard components such as monitors, keyboards, disk drives, CD-ROM drives, network interface components, and the like. Clients can be configured with many different hardware components and can be made in many dimensions and styles (e.g., laptop, tablet PC, personal digital assistant, mobile phone, smart phone, server, workstation, mainframe); network connections may be provided via any suitable transport media (e.g., wired, optical, and/or wireless media) and any suitable communication protocol (e.g., TCP/IP).

The functions of instant messaging server 118 and EIM manager 116 may be combined into a single server system or divided among any number of systems, and server systems may be implemented using any hardware and/or software components. Incoming message module 128, outgoing message module 130, and token module 124 may be implemented as components of a single process, as separate processes on a single system, or as one or more processes on separate systems. Connections between various clients and servers may be made in any manner desired, including local area networks, wide area networks, Internet, and so on. It is to be understood that the terms "server" and "client," as used in this application and the industry, are not fixed with respect to machines or software processes executing on the machines. Typically, a server is a machine or process that is providing services to another machine or process, i.e., the client, that requests the services. In this respect, a computer or process can be acting as a client at one point in time (because it is requesting a service) and can be acting as a server at another point in time (because it is providing a service).

In some embodiments, incoming e-mail messages need not be replies to outgoing instant messages, and an exchange of messages may be initiated by either party, as long as each incoming e-mail message includes a valid token. For instance, instant messaging user P may be able to request and obtain a token for communication with e-mail user E from EIM manager 124 without also sending a message to user E. User P can then provide the token to user E via various media (e.g., e-mail, telephone, hardcopy), thereby enabling user E to initiate an exchange of messages via system 100.

The token T may include any data that can be used to associate an incoming e-mail message with an IM user, and the token may be stored in an outgoing e-mail message from the EIM manager in any manner that reasonably assures its inclusion in any reply to the outgoing e-mail message. Specific embodiments of token T will now be described.

As noted above, it is desirable that inclusion of token T in such a reply occur automatically, i.e., without requiring any special action on the part of e-mail user E, user E's e-mail client 104 or e-mail server 126. Accordingly, token T is advantageously included in an e-mail header field of outgoing message 112 that is expected, according to a standard e-mail protocol, to be returned to EIM manager 116 in any reply message 114. For example, according to existing e-mail protocols, the address of the recipient (in the "To:" header) of a reply message is filled using an e-mail address obtained from either the "Reply-To:" or "From:" header of the message being replied to. Thus, token T is advantageously included in one or both of the "Reply-To:" and "From:" headers of outgoing e-mail message 112.

More specifically, in one embodiment of the invention, token T is used as the username portion of a fully qualified e-mail address in both the "From:" and "Reply-To:" headers of e-mail message 118 to cover both cases described above. Since token T may be unrecognizable to user E, a more recognizable identifier of user P may also be provided, such as P's user name or another identifier associated with user P (e.g., P's full name). Selection of an identifier to use may be an option available to user P via instant messaging client 102. In this embodiment, if EIM manager 116 has the network name "eimmanager.com," then both the "From:" and "Reply-To:" headers of outgoing e-mail message 112 contain:

From: "P identifier" <T@immanager.com>.
Reply-To: "P identifier" <T@immanager.com>.

Since e-mail clients use either the "From:" or "Reply-To:" header of a received message to generate the "To:" header for a reply message, reply message 114 contains the header:

To: "P identifier" <T@immanager.com> and thus contains token T. When EIM manager 116 receives reply message 114, incoming message module 130 extracts the token T from the "To:" header and compares it to tokens stored by token module 124. If a match is found, then the message is confirmed as a reply to an instant message and is forwarded to user P. If no match is found, incoming message module 130 rejects the message, e.g., by returning it to the sender as undeliverable.

Examples of content of token T will now be described. While some embodiments of the invention may allow user P to define all or part of the token, tokens are preferably generated by EIM manager 116 in such a manner that valid tokens are hard to predict, to prevent interlopers from injecting messages improperly by guessing valid tokens. As noted above, token T is used to identify an incoming message as a reply to an instant message sent by a particular instant messaging user. Accordingly, token T may contain any information that assists in that identification. For instance, token T may simply be a serial number or random number associated with a particular outgoing message, with each message sent by user P to user E resulting in a new token T. This, however, can result in a rapid proliferation of tokens if user P exchanges multiple messages with user E. Therefore, it is advantageous if token T is reusable.

Accordingly, in one embodiment of the present invention, token module 124 maintains a token table that stores various information in association with each stored token. Token T is implemented as a character string that uniquely identifies an entry in the token table. FIG. 4 illustrates an example of a token table 400 having a number of entries 401, each identified by a respective token T. Token table 400 includes various fields, including an IM user identifier 402, an e-mail user identifier 404, an alias list 406, an address mismatch counter 408, and a timestamp 410. These fields will now be described.

IM user identifier 402 identifies the instant messaging user P who sent the message that caused token T and token table entry 401 to be created. Identifier 402 is advantageously used to route reply messages back to P, since the headers of the reply e-mail message might not include an adequate identifier for P. E-mail user identifier 404 provides the e-mail address to which the original instant message from P was addressed. When a reply including token T is received, e-mail user identifier 404 can be used to verify that the "From:" header of the reply matches the e-mail address to which the message was sent. Reply messages in which the "From:" header does not match e-mail user identifier 404 may be rejected or, if accepted, may be regarded as suspicious. In some embodiments, the mismatch is simply ignored. Handling of suspicious messages will be described further below.

Mismatch counter 408 contains a count value indicating the number of suspicious reply messages that have been received. In some embodiments, a token T is invalidated and its entry 401 is removed from token table 400 if too many suspicious messages (as determined by the value stored in mismatch counter 408) are received. Mismatch counter 408 may be implemented as a downward counter that starts at a preselected value (e.g., 3) and decrements each time a suspicious reply is received. When mismatch counter 408 reaches zero, the token is invalidated. Mismatch counter 408 may also be implemented as an upward counter, with the token being invalidated if the counter value reaches a preselected maximum. Mismatch counter 408 might be implemented with a time component such that invalidation occurs if a threshold number of mismatches occur within a threshold time period or other time-based criteria.

As is known in the art, due to the nature of e-mail systems, there may be a legitimate reason why the "From:" address of a reply message does not match e-mail user identifier 404. For example, user E may have a permanent e-mail address (e.g., E@alum.univ.edu); messages sent to this address are automatically forwarded to another address (e.g., E@isp.com), which is E's active e-mail account. If user P sends an e-mail instant message to E@alum.univ.edu, the address "E@alum.univ.edu" is stored as e-mail user identifier 404. When user E receives the forwarded message and replies to the message, the "From:" header in the reply message may include "E@isp.com," which does not match the stored identifier 404. As another example, user P may send a message to user E at a POP (point of presence) mail server (E@pop.com), and user E may access her POP mail account from different locations. Depending on E's location, the "From:" header in the reply may be different (e.g., E@work.com if E accesses the POP server while at work, E@isp.com if E accesses the POP server at home).

To allow such situations to occur without repeatedly invalidating the token, an alias list 406 that stores one or more alternative reply addresses is advantageously included in token table 400. When a token is created, alias list 406 is empty. If a suspicious reply message is received (e.g., a message from E@isp.com in reply to a message to E@alum.univ.edu) and P replies to the suspicious reply message, the "From:" address of the suspicious reply message (E@isp.com) is added to alias list 406, so that future reply messages from that address are not regarded as suspicious; for instance, mismatch counter 408 is not decremented if the reply came from an address included in alias list 406. It should be noted that aliases stored in alias list 406 are advantageously not used as "To:" addresses for subsequent responses from P; that is, P's messages are sent to the address stored in identifier 404.

Timestamp 410 stores the date (and optionally, time of day) of the most recent message sent from user P to user E. Timestamp 410 allows tokens that have not been used for some fixed period (e.g., three months) to be deleted. This reduces the need to store obsolete tokens, thereby reducing the storage space required for token table 400. Also, because an e-mail user may preserve an address containing a token indefinitely and send messages to it at any time, a token expiration mechanism provides some measure of protection for P against unwanted messages from an e-mail user with whom P no longer desires to communicate.

It will be appreciated that the foregoing token table is illustrative and that in other embodiments, a token table may include more, less, and/or different information. Token table entries may be implemented using various data structures; terms such as "field" and "list" as used herein include appropriate portions of any such data structure. In addition, any or all of the information may be encoded in the token itself rather than using fields in a token table entry.

Figure 5:
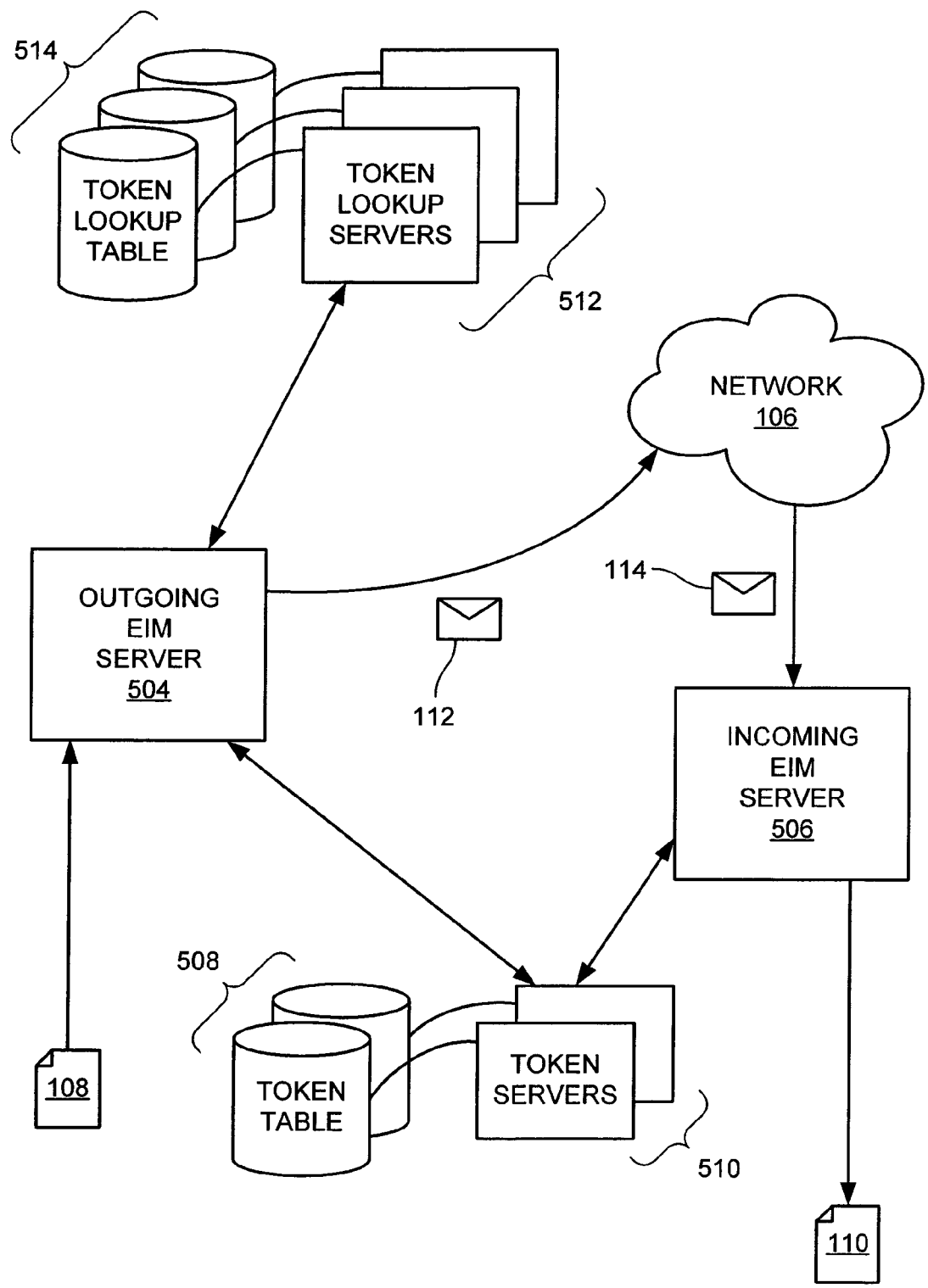
FIG. 5 is a block diagram of an e-mail instant message manager according to an embodiment of the present invention.

As described above, a token is advantageously made unique to a particular pair of users (P and E). Those skilled in the art will recognize that an instant messaging service with a large number of subscribers may need to manage a large number of tokens. FIG. 5 illustrates an embodiment of EIM manager 116 of FIG. 1 that is scalable to manage a large number of tokens efficiently. In this embodiment, outgoing instant message 108 is processed by an outgoing EIM server 504 that implements outgoing message module 128 of FIG. 1 and incoming e-mail message 114 is processed by an incoming EIM server 506 that implements incoming message module 130 of FIG. 1.

A number of token servers 510 are accessible to outgoing EIM server 504 and incoming EIM server 506; any number of token servers 510 may be supported. Token servers 510 implement token module 124 of FIG. 1. More specifically, each token server 510 maintains a token table 508, which may have the content of token table 400 of FIG. 4. Token T is advantageously implemented as a two-part identifier of a token table entry. A first part (T1) identifies which one of token servers 510 has an entry in its token table 508 corresponding to the token T, and a second part (T2) identifies the entry. In one embodiment, token T is a 32-character string; T1 comprises 5 characters identifying a particular token server 510, and T2 comprises 27 characters identifying a token table entry on the token server identified by string T1.

Incoming EIM server 506 receives an e-mail message 114 containing a token T and parses the token into parts T1 and T2. Server 506 queries the token server 510 identified by T1 to retrieve the token table entry identified by T2 and uses the retrieved token table entry to process message 114, thereby generating instant message 110. The token structure enables incoming EIM server 506 to avoid querying each token server 510 in turn to locate a matching token.

Outgoing EIM server 504 receives an instant message 108 from instant messaging user P addressed to e-mail user E. If a valid token exists for exchanging messages between P and E, outgoing EIM server 504 reuses the token; otherwise, it creates a new token. In some embodiments, an existing token may be provided with the instant message. In other embodiments, to assist outgoing EIM server 508 in locating existing tokens, a number of token lookup servers 512 are provided. Each token lookup server 512 maintains a token lookup table 514 that maps the pair of user identifiers (P, E) to a token T. The number of token lookup servers 512 need not be equal to the number of token servers 510, and the server-identifying (T1) portion of an entry in a token lookup table 514 on any token lookup server 512 may correspond to any one of token servers 510. Outgoing EIM server 504 accesses token lookup servers 512 to find a token T, then accesses the appropriate one of token servers 510 to retrieve the token table entry. If no token exists, outgoing EIM server 504 creates a new token using one of the token servers 510 and stores an appropriate mapping for the new token in one of token lookup tables 514. Where the scale is appropriate, the functions of token servers and token lookup servers might be shared by a more general purpose server.

Figure 6:
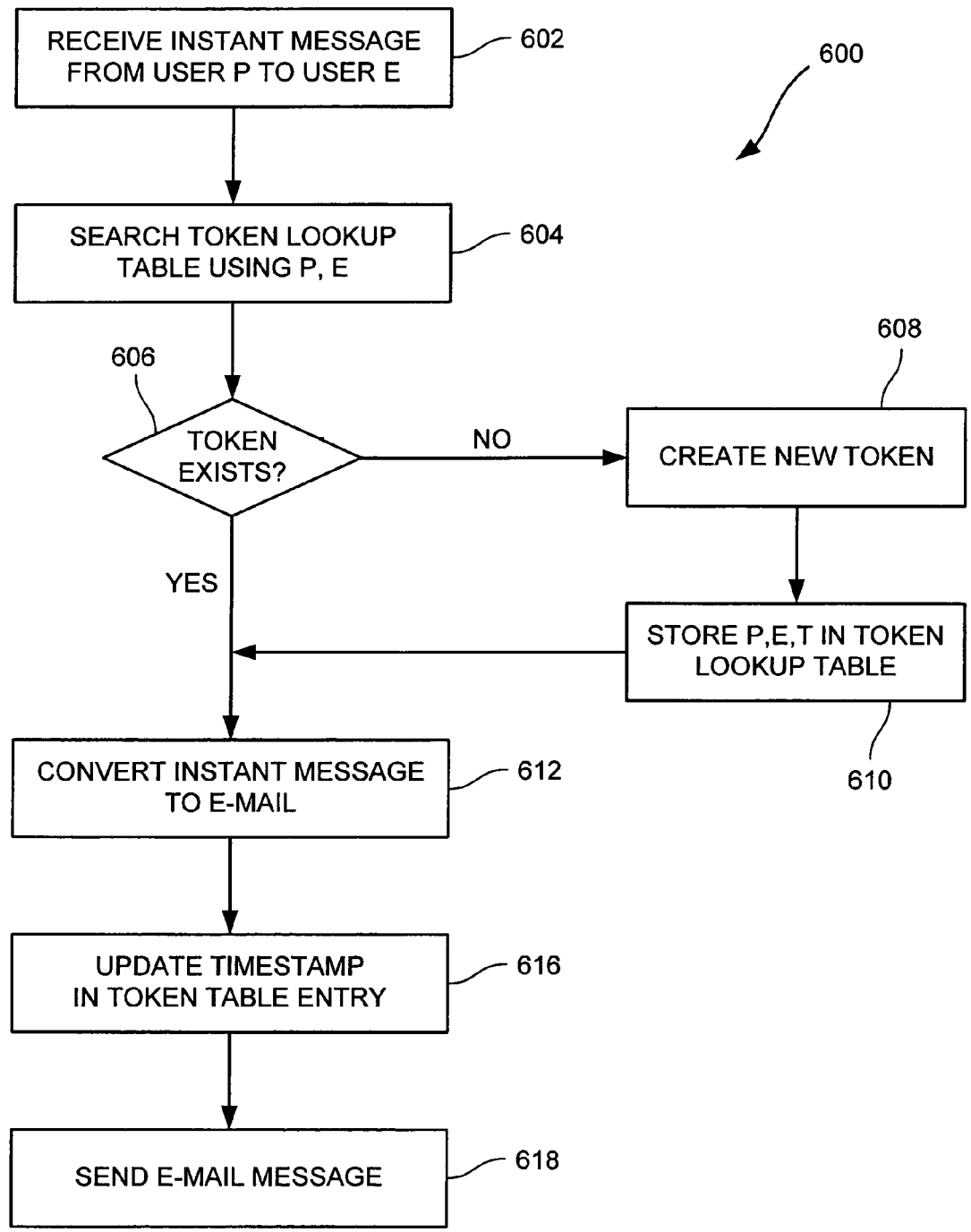
FIG. 6 is a flow diagram of a process for transmitting an instant message to an e-mail user according to an embodiment of the present invention.

Examples of processes for handling outgoing instant messages and incoming e-mail messages that might be performed by outgoing and incoming EIM servers 504, 506 will now be described. FIG. 6 is a flow diagram of a process 600 performed by outgoing EIM server 504 to send a message from an instant messaging user P to an e-mail user E.

At step 602, server 504 receives outgoing instant message 108 from instant messaging user P addressed to an e-mail user E. Instant message 108 advantageously includes user E's fully qualified e-mail address (e.g., E@email.com). At step 604, server 504 searches one or more token lookup tables 514 on token lookup servers 512 to find a token corresponding to the user names or fully qualified addresses ("values") of users P and E. For instance, server 504 may hash the values of P and E to select one of token lookup servers 512, then provide the values of P and E to the selected token lookup server 512. The selected token lookup server 512 performs a lookup operation in its token lookup table 514. If a token is found, the token value T is returned; otherwise, token lookup server 512 indicates that a token does not exist.

At step 606, server 504 checks the result of the search. If a token was found, it is used. If no token was found, the server creates a new token T at step 608. For instance, server 504 may select one of token servers 510 (e.g., on a round-robin, pseudo-random, or other basis that distributes traffic among the multiple token servers 510) and instruct the selected token server 510 to generate a new entry in its token table 508. Token server 510 creates an entry and an identifier (T2) for the entry. It is advantageous if entry identifiers T2 are generated in a non-sequential fashion, making valid token values more difficult for unauthorized third parties to guess; for instance, entry identifier T2 may be a random or pseudo-random number, bit sequence or character string. In one embodiment, entry identifier T2 is generated by selecting a random number, applying a hash function, then applying a "signature" algorithm (e.g., the well-known MD5 or SHA-1 algorithms) that generates a unique signature from a character string. Server 510 returns the entry identifier T2 to outgoing EIM server 504. Outgoing EIM server 504 concatenates an identifier (T1) of the token server and the entry identifier T2, thereby generating a token T. Token T is advantageously base-64 encoded so that the characters can be correctly displayed and transmitted in a standard e-mail header.

Where token table 508 stores additional data, that data is also initialized during step 608. For instance, if the token table has the fields shown in FIG. 4, instant messaging user field 402 is filled with a unique identifier (e.g., user name) of P and e-mail user field 404 is filled with "E@email.com." Alias list 406 is initialized to contain no data, indicating that no valid aliases for user E are yet known. Mismatch counter 408 is initialized to a preselected value, e.g., 1, 3, 10, 100, and timestamp 410 may be initialized with the current date (and optionally, the current time).

At step 610, a mapping from the values of P and E to the token T is stored in a token lookup table 514. For instance, outgoing EIM server 504 may hash the values of P and E to select one of token lookup servers 512, then provide the values of P, E, and T to be stored in the token lookup table 514 of the selected token lookup server 512. Since hash functions are deterministic, the token lookup server 512 selected at step 610 will be the same one of token lookup servers 512 that is selected at step 604. Accordingly, outgoing EIM server 504 will be able to find an existing token by querying only one of token lookup servers 512. It should be noted that any deterministic function that distributes traffic among the multiple token lookup servers 512 may be used at steps 604 and 610.

After the token has been retrieved or created, at step 612, instant message 108 is converted to e-mail message 112. E-mail message 112, which may have the content shown in FIG. 3, or different content, includes token T. At step 616, the timestamp 410 in the token table entry is updated to reflect the current time and date. At step 618, e-mail message 112 is sent to the address E@email.com using a conventional e-mail protocol.

In due course, e-mail user E receives e-mail message 112 and, as with any other e-mail message, may elect to reply immediately, keep the message and reply later, or not reply at all. In some embodiments, if E does not reply within a certain time (e.g., eight hours, two weeks, three months, one year) the token T expires and is removed from token table 508 (the corresponding entry is also removed from token lookup table 514).

Figure 7:
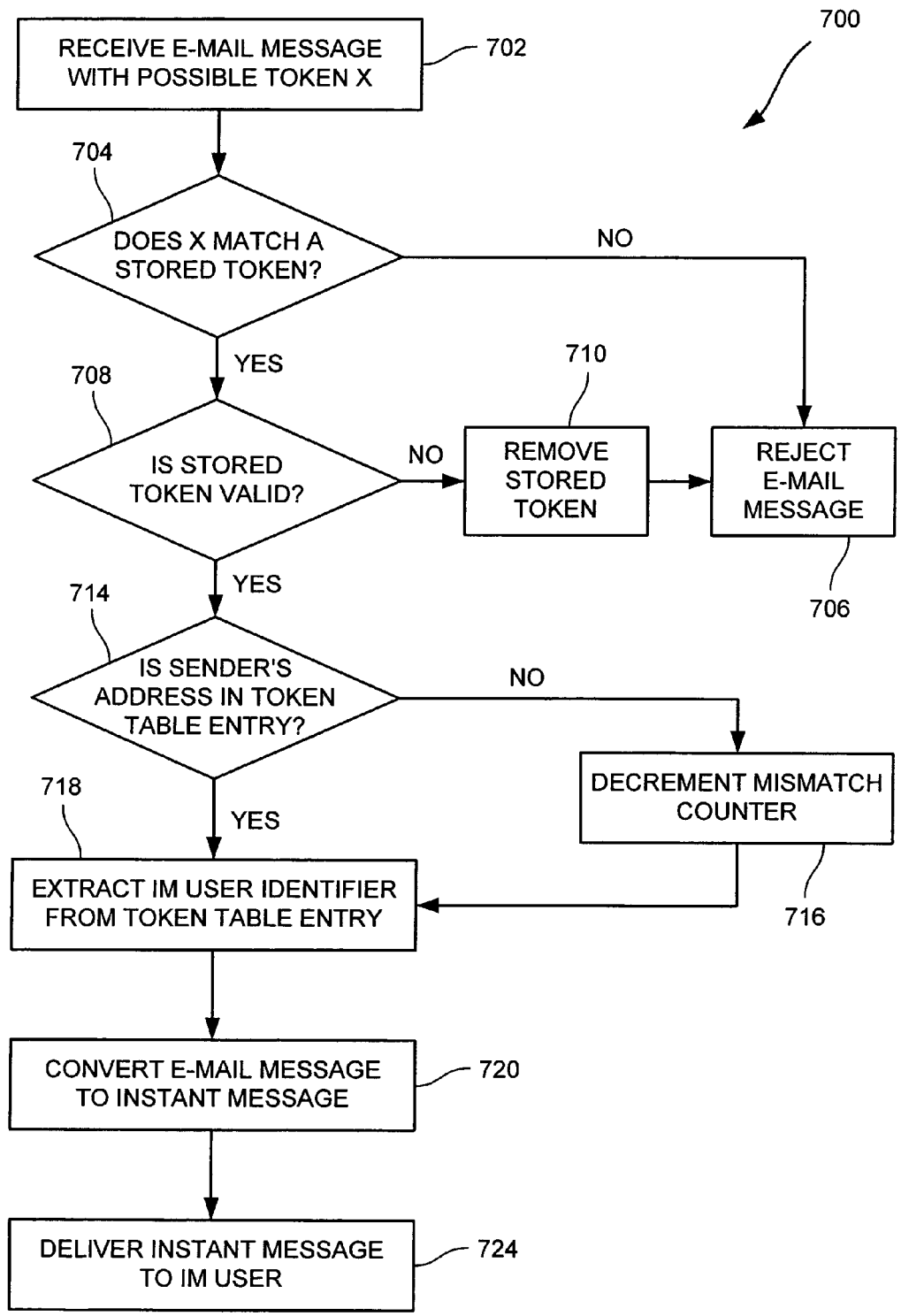
FIG. 7 is a flow diagram of a process of transmitting an e-mail message to an instant messaging user according to an embodiment of the present invention.

FIG. 7 illustrates a process 700 performed by incoming EIM server 506 to convert an incoming e-mail message 114 to an instant message 110. Incoming e-mail message 114 may or may not be a legitimate message from e-mail user E to instant messaging user P; process 700 includes validation steps that reduce the likelihood of delivering messages that are not legitimate.

More specifically, at step 702, server 506 receives an e-mail message 114 containing what appears to be a token. For instance, message 114 may be addressed to X@eimmanager.com. The message may have been generated by e-mail user E or by someone else, and the character string X may or may not correspond to a valid token. At step 704, server 506 determines whether string X matches a token. For instance, server 506 may attempt to parse X into X1 and X2 using a parsing process that corresponds to how token portions T1 and T2 are generated. If X parses correctly, server 506 queries the token server 510 identified by X1 for a token table entry identified by X2. If any part of this process fails, X is deemed to be not a valid token, and server 506 rejects the incoming e-mail message (step 706), e.g., by returning it to the sender with an indication that the address is not valid or simply disposing of the message. Preferably, indications sent to the sender cannot be used by an invalid sender to identify private information, such as whether a target has an instant messaging account.

If a token is found at step 704, then at step 708 server 506 retrieves the appropriate token table entry from the identified token server 510 and determines whether the token is valid. For instance, server 506 may check that the mismatch count 408 in the token table entry has not reached zero and that the timestamp 410 is current (e.g., not older than 3 months). If the token is invalid, then at step 710 server 506 instructs the appropriate token server 510 to remove the entry from its token table 508, and the incoming e-mail message is bounced at step 706. In one embodiment, incoming EIM server 506 also instructs the appropriate token lookup server 512 to delete the corresponding entry from its token lookup table 514. In another embodiment, outgoing EIM server 504 detects entries in token lookup tables 514 for which a valid token no longer exists and instructs token lookup servers 512 to delete such entries. In yet another embodiment, a separate cleanup process is periodically executed to remove invalid entries from token tables 508 and token lookup tables 514.

If the token is validated at step 708, then at step 714, incoming EIM server 506 checks the sender's address (F), extracted from the "From:" field of e-mail message 114 against valid addresses stored in the token table entry, including e-mail user identifier 404 and any aliases in alias list 406. If the sender's address F does not match any of the stored valid addresses, the mismatch counter 408 is decremented at step 716. In this embodiment, the message is delivered but considered suspicious. (If the counter is decremented to zero at step 716, the next incoming message that contains this token and has a mismatched address will be rejected.) Since the mismatched sender's address is suspicious, it is advantageously not added to alias list 406 during process 700.

At step 718, the intended recipient (user P) is identified, e.g., by reading the instant messaging user identifier 402 in the token table entry. At step 720, e-mail message 114 is converted to an instant message 110 addressed to user P. In the case of a suspicious message, instant message 110 is advantageously labeled to reflect the address mismatch (e.g., with a label such as "E (from F)" as shown in message window 220 in FIG. 2). Providing both identifiers can assist user P in determining whether the message is a legitimate reply.

E-mail message 114 may include attached files, and embodiments of incoming EIM server 506 may handle attached files in various ways. In some embodiments, attached files are simply dropped, and an informational e-mail message is sent to user E advising that the files were not delivered; instant message 110 may also include an indication that attached files were dropped. In another embodiment, an attached file may be converted to a file transfer message conforming to a protocol for exchanging files between IM users; examples of such protocols are known in the art. Because of the potentially large size of the file transfer message, conversion of an attachment to a file transfer message may not be desirable, e.g., if instant message 110 is to be stored for later delivery in the event that user P is not online. In yet another embodiment, incoming EIM server 506 places the attached file in a temporary location (e.g., on a World Wide Web server) and provides a link to the temporary location in instant message 110. It will be appreciated that other techniques for handling attached files may also be implemented.

Instant message 110 is then delivered at step 724. In some embodiments, incoming EIM server 506 delivers the message to user P directly; in others, it may route the message to IM server 118 for delivery. Delivery may vary depending on whether user P is online (i.e., logged in to the instant messaging service and running instant messaging client 102) at the time the reply is received. For instance, in some embodiments, messages received while P is offline are rejected; in other embodiments, such messages are queued in an offline storage area of IM server 118 that accumulates messages while P is offline for delivery when P is next online. In some embodiments, if the offline storage area is full (or does not exist) and IM server 118 has a valid e-mail address for user P, messages received while P is offline may be redirected to P's e-mail address. If a message is rejected, server 506 may be instructed to send an e-mail message to the sender (advantageously using the address stored in e-mail user identifier 404 rather than a different address F that may have been extracted from the incoming e-mail message) advising that the message was rejected. In some embodiments, no message is returned to a rejected message sender, so that an unauthorized sender cannot learn about valid tokens by repeatedly addressing an EIM server.

After receiving instant message 110 from e-mail user E, instant messaging user P may elect to respond. Processing of P's response is generally similar to process 600, with a few exceptions. For instance, in some embodiments, timestamp 410 in the token table entry 401 is not updated when P receives a message, only when P sends a message. Thus, if P has not sent a message to E in a while, the token may have expired; in that case, a new token is generated and the message is sent using the new token.

Figure 8:
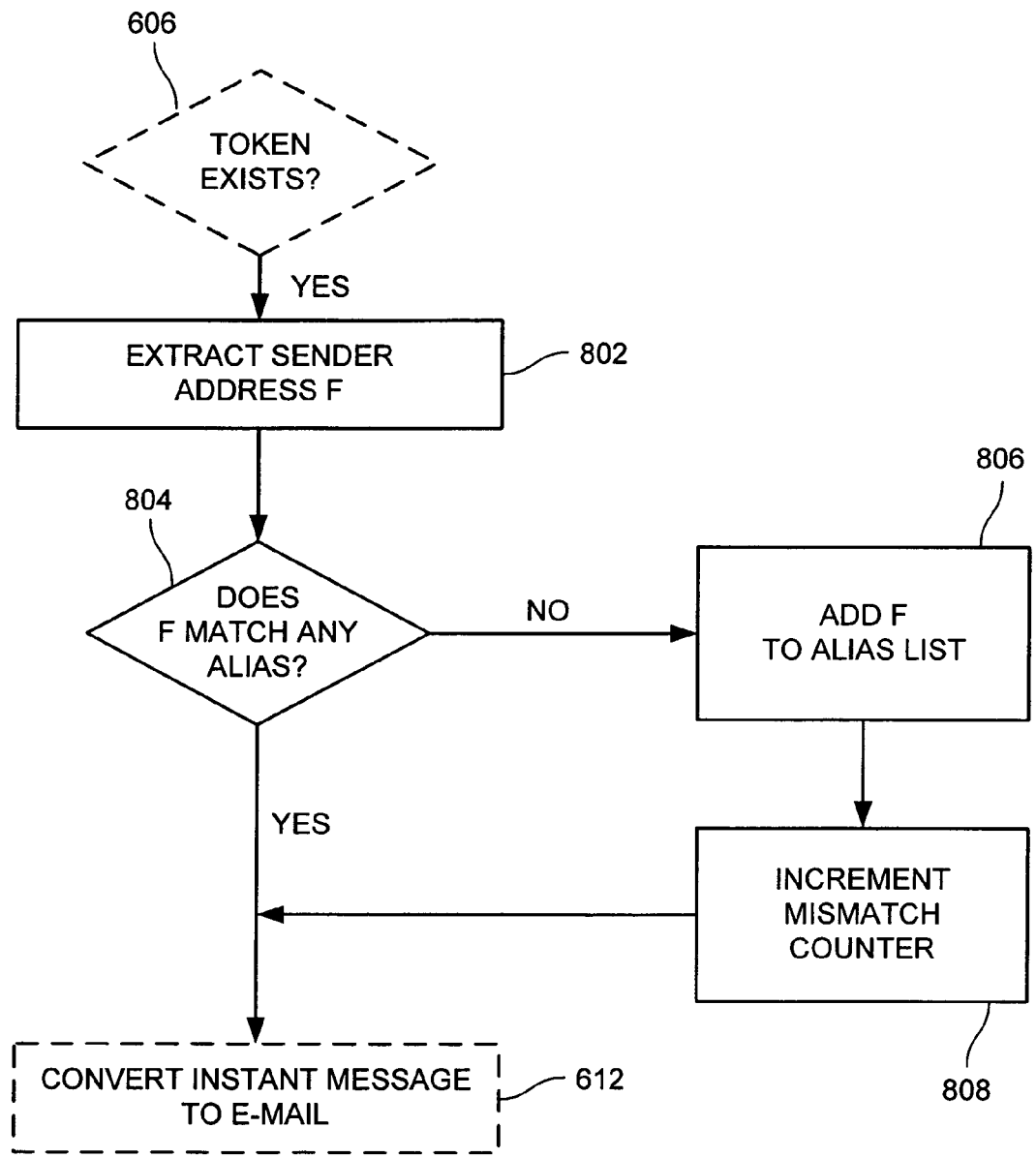
FIG. 8 is a flow diagram of a portion of a process for transmitting an instant message in reply to an e-mail message according to an embodiment of the present invention.

As another example, if a token already exists for messages between P and E, a reply by P to a suspicious message (i.e., an incoming e-mail message where the sender's address F did not match a known address for user E) causes the sender address F to be added to alias field 406 of the token table entry. FIG. 8 is a flow chart showing processing steps for adding an alias according to one embodiment of the invention. As indicated by dashed lines in FIG. 8, these steps are performed by outgoing EIM server 504 prior to step 612 of process 600 (FIG. 6) in the event that the "YES" branch is taken at step 606.

At step 802, the address F is extracted from P's reply. At step 804, it is determined whether address F matches any of the identifiers stored in the token table entry, i.e., e-mail user identifier 404 or aliases 406. If not, then at step 806, address F is added to alias list 406. In some embodiments, alias list 406 stores a limited number (e.g., three or ten) of aliases; if the field is full, an old alias (e.g., the least recently used) may be removed to make space to store address F. At step 808, the mismatch counter 408 (which was decremented in process 700 when the suspicious sender address F was detected) is incremented, reflecting that address F is no longer a suspicious address. In an alternative embodiment, mismatch counter 408 is not incremented; this may limit the number of different aliases that e-mail user E may use for communicating with user P. Processing continues at step 612 of process 600. It should be noted that the processing steps shown in FIG. 6 advantageously use the reliable identifier E (i.e., the e-mail user identifier 404 stored in token table entry 401).

It will be appreciated that the EIM manager configuration and processes described herein are illustrative and that variations and modifications are possible. Processing steps described as sequential may be executed in parallel, order of steps may be varied, and steps may be modified or combined. Any number of outgoing and/or incoming EIM servers may be provided, and various criteria may be used to select an appropriate number of outgoing EIM servers, incoming EIM servers, token servers and token lookup servers to manage traffic in a particular system. Any techniques may be used to distribute traffic among the servers. The formats for e-mail messages and instant messages may be varied as desired.

It should be noted that the processes described above provide instant messaging users with protection against abuses of the system comparable to protections in existing instant messaging systems. For example, spam and impersonation are both distinguishable from legitimate messages, as will now be described.

"Spam" generally refers to unsolicited e-mail (often, but not necessarily, commercial) from parties with whom the recipient has no existing relationship. As one line of defense, incoming e-mail messages that do not include a valid token are rejected as described above. Thus, a spammer cannot reach instant messaging user P unless the spammer obtains a valid token. Tokens can be made difficult to guess (e.g., arbitrary 64-bit numbers, 1024-bit numbers, 32-byte strings, etc., generated randomly or pseudo-randomly), so that a spammer is unlikely to reach any instant messaging users without stealing a token.

If the spammer does manage to obtain a valid token and send a message, another line of defense is provided by the mismatch counter 408. Assuming that P does not reply to the spam, mismatch counter 408 decrements each time a spam message is received; when counter 408 reaches zero, the token is automatically invalidated, blocking further messages sent with that token. If user P does reply, a further line of defense is provided by using address E rather than address F (the spammer's address) as the destination for P's reply. As long as the spammer does not have access to e-mail sent to address E, the reply will not be received by the spammer.

As yet another line of defense, user P's instant messaging client 102 may provide a user interface option to invalidate a token (e.g., via the "Ignore User" button 236 or another button in incoming message window 230 of FIG. 2). If P receives a spam message, he may simply exercise this option. The offending token is identified and immediately removed from the token table, so that further messages using the offending token will be rejected by EIM manager 116.

It should be noted that these defenses against spam need not interfere with legitimate communication between users P and E. Any time a token is invalidated, P can create a new token simply by sending a new instant message to E. Once a token is invalidated, E will be unable to send further messages to P until P sends a new message to E, but as long as P desires to exchange messages with E, this will eventually occur.

"Impersonation" refers to a third party pretending to be e-mail user E, e.g., by forging a "From:" header to include E's address. To impersonate E in communication with P, an impersonator must also obtain a valid token; as discussed above, this can be made difficult. In addition, in some embodiments, user P's replies are always sent to the address P provided for user E, not the "Reply-To:" address of the e-mail (which may be the impersonator's). Thus, unless the impersonator also has access to e-mail addressed to E, the impersonator will not receive a reply from P. Further, if P realizes that an incoming message is from an impersonator, he can invalidate the token as described above to avoid receiving further spurious messages.

Some embodiments of the present invention also support interaction between an instant messaging user P and a subscriber-based e-mail distribution list (or other e-mail based message board) using an instant messaging client. As is known in the art, users subscribe to an e-mail distribution list by providing their e-mail addresses to a subscription address of the list manager, and e-mail messages from any subscriber sent to a designated "list address" are forwarded to the e-mail addresses of all subscribers. Management of the list may be manual or automated to any desired degree.

In one embodiment of the invention, user P subscribes to the list by sending an instant message to the subscription e-mail address of the list manager. As described above, the instant message is converted to an e-mail message from an address TL@eimserver.com, for example, where TL is a token generated when P sends the message, and address TL@eimserver.com is subscribed to the list. Thus, messages from the list to user P include token TL, and P is able to receive and respond to such messages using his instant messaging client as described above. In some embodiments, the e-mail user identifier 404 in the token table entry for token TL may be set to the list address, so that P's replies to messages from the list are directed to the list.

The token table entry for token TL might advantageously include a flag indicating that the token is being used for communication with a distribution list. This flag causes the "From:" header on e-mail messages received from the list to be ignored, so that the token will not be invalidated if messages from the list arrive with many different "From:" addresses identifying the various list members who sent the messages. When replying to a message received from the distribution list, P may be given an option to direct the reply to the list (using the existing token TL for communicating with the list) or to the sender privately (using a different token, which may already exist if P has previously sent a private message to the sender's e-mail address). It may also be provided that a token flagged as belonging to a distribution list does not expire (e.g., timestamp 410 may be ignored), so that P may continue to receive messages from the list indefinitely, even if he or she does not reply to any of them.

While the invention has been described with respect to specific embodiments, one skilled in the art will recognize that numerous modifications are possible. The various components of an instant messaging system may be implemented using hardware components, programmable devices (e.g., microprocessors) executing software instructions, and any combination thereof. Tokens and token table entries may have any structure and include any desired information. A token may be included in any portion of an outgoing e-mail message, so long as an incoming reply e-mail message can be recognized as a reply and directed to the proper recipient. Incoming messages received while the recipient is offline may or may not be stored for later delivery. "Instant message" as used herein is not limited to any particular protocol, format, delivery method, or form factor and includes messages delivered according to any protocol that enables communication among a closed community of authenticated users. "E-mail" as used herein is also not limited to any particular protocol, format, delivery method or form factor and includes messages delivered according to any protocol that does not inherently provide recipients with authentication of senders. The use of particular formats for e-mail addresses and headers in the examples above is illustrative and not restrictive of the invention.

Thus, although the invention has been described with respect to specific embodiments, it will be appreciated that the invention is intended to cover all modifications and equivalents within the scope of the following claims.

What is claimed is:

1. A method for exchanging messages between an instant messaging user who is subscribed to an instant messaging service and an e-mail user, the method comprising:
   receiving a first outgoing instant message from the instant messaging user for delivery to an e-mail address of the e-mail user;
   creating a first outgoing e-mail message from the first outgoing instant message prior to delivery of the first outgoing e-mail message to the e-mail user;
   generating a token that represents a unique pairing identifier of the instant messaging user and the e-mail user;
   including the token, in a username portion of a fully qualified e-mail address in a sender-identifying header of the first outgoing email message; and
   transmitting the first outgoing e-mail message to the e-mail address,
   wherein a subsequently received e-mail message addressed to a fully-qualified e-mail address that includes the token as a username portion is deliverable to the instant messaging user as an incoming instant message from the e-mail user, and wherein the token cannot be used by another instant messaging user to deliver an instant message to the e-mail user.

2. The method of claim 1, wherein the sender-identifying header includes at least one of a From header or a Reply-To header of the first outgoing email message.

3. The method of claim 1, wherein creating the first outgoing e-mail message includes converting the first outgoing instant message to an e-mail format.

4. The method of claim 1, wherein creating the first outgoing e-mail message includes inserting a status indicator for the instant messaging user, the status indicator reflecting whether the instant messaging user is online or offline at a time when the first outgoing e-mail message is opened.

5. The method of claim 4, wherein the status indicator includes a hypertext transfer protocol page or image request.

6. The method of claim 1, wherein creating the first outgoing e-mail message includes adding information regarding an e-mail instant messaging service to the first outgoing e-mail message.

7. The method of claim 1, wherein generating the token includes:
   creating an entry in a token table, the entry storing the identifier of the instant messaging user in association with the e-mail address of the e-mail user,
   wherein the token includes an identifier of the token table entry.

8. The method of claim 7, wherein the identifier of the token table entry includes a randomly or pseudo-randomly generated number, bit sequence or character string.

9. The method of claim 7, wherein the token further includes an identifier of a token server that stores the token table.

10. The method of claim 1, further comprising:
    receiving an incoming e-mail message including the token;
    extracting the token from the incoming e-mail message;
    based at least in part on the extracted token, identifying the instant messaging user;
    converting the incoming e-mail message to an incoming instant message; and
    delivering the incoming instant message to the instant messaging user.

11. The method of claim 10, wherein generating the token includes adding the token to a set of valid tokens, the method further comprising:
    determining whether the token extracted from the incoming e-mail message matches a token in the set of valid tokens; and
    rejecting the incoming e-mail message in the event that the extracted token does not match a token in the set of valid tokens.

12. The method of claim 10, wherein generating the token includes creating a corresponding entry in a token table, the token table entry storing the identifier of the instant messaging user in association with the e-mail address of the e-mail user, and wherein identifying the instant messaging user includes retrieving the identifier of the instant messaging user from the token table entry corresponding to the extracted token.

13. The method of claim 12, further comprising:
   retrieving the e-mail address of the e-mail user from the token table entry corresponding to the extracted token;
   comparing a sender address obtained from a From header of the incoming e-mail message to the retrieved e-mail address; and
   treating the incoming e-mail message as suspicious in the event that the sender address does not match the retrieved e-mail address.

14. The method of claim 13, wherein treating the incoming e-mail message as suspicious includes rejecting the incoming e-mail message.

15. The method of claim 13, wherein the token table entry includes a list of aliases for the e-mail user, the method further comprising:
   no longer treating the incoming e-mail message as suspicious in the event that the sender address matches an alias in the list of aliases.

16. The method of claim 13, wherein the token table entry includes a mismatch counter and treating the incoming e-mail message as suspicious includes updating the value of the mismatch counter, wherein the incoming e-mail message is rejected in the event that the mismatch counter reaches a threshold value.

17. The method of claim 10, wherein delivering the incoming instant message to the instant messaging user includes:
   in the event that an instant messaging client for the instant messaging user is accessible, providing the incoming instant message to the instant messaging client for display; and
   in the event that the instant messaging client is not accessible, storing the incoming instant message, wherein the stored message is subsequently provided to the instant messaging client at a time when the instant messaging client is accessible.

18. The method of claim 10, wherein delivering the incoming instant message to the instant messaging user includes:
   in the event that an instant messaging client for the instant messaging user is accessible, providing the incoming instant message to the instant messaging client for display; and
   in the event that the instant messaging client is not accessible, redirecting the incoming instant message to an e-mail address of the instant messaging user.

19. The method of claim 10, further comprising:
   receiving a second outgoing instant message from the instant messaging user, the second outgoing instant message being a reply to the incoming instant message;
   using the identifier of the instant messaging user and the e-mail address of the e-mail user to locate the token that was previously generated;
   creating a second outgoing e-mail message from the second outgoing instant message;
   including the token, in a username portion of a fully qualified e-mail address in a sender-identifying header of the second outgoing e-mail message; and
   transmitting the second outgoing e-mail message to the e-mail address of the e-mail user.

20. The method of claim 19, wherein the token identifies an entry in a token table, the token table entry including the identifier of the instant messaging user and the e-mail address of the e-mail user.

21. The method of claim 20, wherein transmitting the second outgoing e-mail address to the e-mail address of the e-mail user includes determining the e-mail address of the e-mail user from the token table entry.

22. The method of claim 21, wherein the token table entry includes a list of aliases for the e-mail address of the e-mail user, the method further comprising:
   in response to receiving the second outgoing instant message, determining whether a sender address obtained from a From header of the incoming e-mail message matches the e-mail address of the e-mail user stored in the token table entry or an alias in the list of aliases; and
   in the event that the sender address does not match the stored e-mail address or any alias, adding the sender address to the list of aliases.

23. The method of claim 20, wherein the token table entry includes a timestamp and the token table entry is deleted in the event that the timestamp corresponds to a time prior to an expiration time, the method further comprising:
   updating the timestamp with a time corresponding to transmission of the second outgoing e-mail message.

24. The method of claim 1 wherein the e-mail user is not subscribed to the instant messaging service.

25. The method of claim 1 wherein the e-mail address of the e-mail user is provided by the instant messaging user.

26. The method of claim 1 wherein the act of generating the token is performed in response to receiving the first outgoing instant message.

27. The method of claim 1 wherein the act of generating the token is performed in response to a token creation request from the instant messaging user, the token creation request including the e-mail address of the e-mail user.

28. The method of claim 27 wherein the act of inserting the token includes retrieving a previously generated token.

29. A method for exchanging messages between an instant messaging user who is subscribed to an instant messaging service and an e-mail user, the method comprising:
   generating and storing a token that represents a pairing identifier of the instant messaging in user and an e-mail address of the e-mail user, wherein generating and storing the token is initiated by the instant messaging user;
   receiving an incoming e-mail message that includes the token as a username portion of a fully-qualified e-mail address of a recipient of the incoming e-mail message;
   extracting the token from the incoming e-mail message;
   based at least in part on the token, identifying the instant messaging user and checking the e-mail address associated with the token against a sender's e-mail address in the incoming e-mail message;
   converting the incoming e-mail message to an incoming instant message to deliver the incoming instant message to the instant messaging user in place of the incoming e-mail message; and
   delivering the incoming instant message to the instant messaging user when the sender's e-mail address in the incoming e-mail message matches the e-mail address associated with the token.

30. The method of claim 29, further comprising associating a second e-mail address to the token, and delivering a second incoming instant message to the instant messaging user when the sender's e-mail address in the second incoming instant message matches either the e-mail address or the second e-mail address associated with the token.

31. The method of claim 29 wherein the e-mail user is not subscribed to the instant messaging service.

32. The method of claim 29 wherein the e-mail address of the e-mail user is provided by the instant messaging user.

33. A system of hardware components for transmitting messages between an instant messaging user who is subscribed to an instant messaging service and e-mail user, the system of hardware components comprising:

an outgoing message module configured to receive an outgoing instant message from the instant messaging user for delivery to an e-mail address of the e-mail user and to convert the outgoing instant message into an outgoing e-mail message to deliver the outgoing e-mail message to the e-mail user in place of the outgoing instant message, the outgoing e-mail message including, in a username portion of a fully-qualified e-mail address in a sender identifying header, a first token representing a pair identifier of the instant messaging user and the e-mail address of the e-mail user, the outgoing message module being further configured to transmit the outgoing e-mail message to the e-mail user;

an incoming message module configured to receive an incoming e-mail message that includes the first token, to convert the incoming e-mail message into an incoming instant message based at least in part on the first token, and to transmit the incoming instant message to the instant messaging user; and a token module configured to communicate with the outgoing message module and the incoming message module, the token module further configured to maintain a set of valid tokens including at least the first token and a second token representing a pair identifier of the instant messaging user and a second e-mail address different from the e-mail address.

34. The system of claim 33, wherein the incoming message module is further configured to reject an incoming e-mail message that includes a second token in the event that the second token is not in the set of valid tokens.

35. The system of claim 33, wherein the sender-identifying header includes at least one of a From header or a Reply-To header of the outgoing e-mail message.

36. The system of claim 33, wherein the outgoing message module is further configured to add further data to a body portion of the outgoing e-mail message.

37. The system of claim 36, wherein the added data includes a status indicator for the instant messaging user, the status indicator reflecting whether the instant messaging user is online or offline at a time when the outgoing e-mail message is opened.

38. The system of claim 37, wherein the status indicator includes a hypertext transfer protocol page or image request.

39. The system of claim 36, wherein the added data includes information regarding an e-mail instant messaging service.

40. The system of claim 33, wherein the outgoing message module is further configured to determine whether a token suitable for use as the first token has previously been stored by the token module and, in the event that a suitable token has previously been stored, to use the stored token as the first token.

41. The system of claim 40, further comprising:
a token lookup module in communication with the outgoing message module, the token lookup module configured to store a token lookup table that provides a searchable listing of tokens stored by the token module,
wherein the outgoing message module determines whether a suitable token has previously been stored by communicating with the token lookup module.

42. The system of claim 41, wherein the token lookup table is searchable using an identifier of the instant messaging user and an e-mail address of the e-mail user.

43. The system of claim 33, wherein the token module is further configured to store a token table including a plurality of token table entries, wherein each token table entry is identified by a respective token in the set of valid tokens.

44. The system of claim 43, wherein each token table entry includes an identifier of the instant messaging user and an e-mail address of the e-mail user.

45. The system of claim 44, wherein the incoming message module is further configured to identify the instant messaging user from the token table entry identified by the first token.

46. The system of claim 44, wherein the incoming message module is further configured to compare a sender address of the incoming e-mail message to the e-mail address of the e-mail user in the token table entry identified by the first token and to reject the incoming e-mail message in the event that the sender address does not match the stored e-mail address.

47. The system of claim 44, wherein the incoming message module is further configured to compare a sender address of the incoming e-mail message to the e-mail address of the e-mail user in the token table entry identified by the first token and to treat the incoming e-mail message as a suspicious message in the event that the sender address does not match the stored e-mail address.

48. The system of claim 47, wherein the incoming message module is further configured such that treating the incoming e-mail message as a suspicious message includes maintaining a count of suspicious messages that include the first token and rejecting the incoming e-mail message in the event that the count exceeds a maximum value.

49. The system of claim 33, further comprising:
an instant messaging server configured to communicate with the incoming and outgoing message modules and with an instant messaging client that creates the outgoing instant message,
wherein the instant messaging server is further configured to receive the outgoing instant message from the instant messaging client and to forward the outgoing instant message to the outgoing message module, and
wherein the instant messaging server is further configured to receive the incoming instant message from the incoming message module and to forward the incoming instant message to be displayed by the instant messaging client.

50. The system of claim 33 wherein the e-mail user is not subscribed to the instant messaging service.

51. The system of claim 33 wherein the e-mail address of the e-mail user is provided by the instant messaging user.

52. A method for exchanging messages between an instant messaging user who is subscribed to an instant messaging service and an e-mail user, the method comprising:
receiving a first instant message from the instant messaging user addressed to the e-mail user;
generating a token representing an identifier of a pairing between the instant messaging user and an e-mail address of the e-mail user;
converting the first instant message to a first e-mail message prior to delivery of the first e-mail message to the e-mail user, the first e-mail message including the token in a username portion of a fully-qualified e-mail address in a sender-identifying header;
storing the token in a token table;
transmitting the first e-mail message to the e-mail user;
receiving a second e-mail message from the e-mail user, the second e-mail message addressed to the fully-qualified e-mail address that includes the token;
extracting the token from the second e-mail message;
validating the token by accessing the token table, wherein validating includes checking for the e-mail address in the second e-mail message; and
in the event that the token is validated:
converting the second e-mail message to a second instant message; and delivering the second instant message to the instant messaging user.

53. The method of claim 52 wherein the e-mail user is not subscribed to the instant messaging service.

54. The method of claim 52 wherein the e-mail address of the e-mail user is provided by the instant messaging user.

55. A method for exchanging messages between an instant messaging user who is subscribed to an instant messaging service and an e-mail user, the method comprising:
   generating a first instant message addressed to the e-mail user;
   transmitting the first instant message to an outgoing message server configured to convert the first instant message to a first e-mail message prior to delivery of the first e-mail message to the e-mail user and to include, in a username portion of a fully-qualified e-mail address in a sender-identifying header of the first e-mail message, a token representing a unique pairing identifier of the instant messaging user and the e-mail user;
   receiving a second instant message from an incoming message server configured to receive a second e-mail message originating with the e-mail user, the second e-mail message containing the token or a representation thereof, and to create the second instant message from the second e-mail message only when the second e-mail message originates from the e-mail user.

56. The method of claim 55 wherein the e-mail user is not subscribed to the instant messaging service.

57. The method of claim 55 wherein the token is associated with a first e-mail address of the e-mail user.

58. The method of claim 57 wherein the token is associated with a second e-mail address of the e-mail user, the first and second e-mail addresses different from each other.

59. The method of claim 57 further comprising generating the token in response to a token creation request from the instant messaging user, the token creation request including the first e-mail address of the e-mail user in the first instant message.

60. The method of claim 55 further comprising generating the token based on the instant messaging user.

61. The method of claim 55 further comprising generating another token to exchange messages between the instant messaging user and another e-mail user.

62. A method for exchanging messages between an e-mail user and an instant messaging user who is subscribed to an instant messaging service, the method comprising:
   receiving, at an e-mail client, a first e-mail message that originated from a first instant message sent by the instant messaging user, the first e-mail message created prior to receiving at the e-mail client, the first e-mail message including, in a username portion of a fully-qualified e-mail address in a sender identifying header, a token representing a unique pairing identifier of the instance messaging user and the e-mail address of the e-mail user;
   generating, using the e-mail client, a second e-mail message in reply to the first e-mail message, the second e-mail message being addressed to the fully-qualified e-mail address that includes the token; and
   transmitting the second e-mail message to an instant messaging server configured to recognize the token and convert the second e-mail message to a second instant message deliverable to the instant messaging user.

63. The method of claim 62 wherein the e-mail user is not subscribed to the instant messaging service.

* * * * *